(12) United States Patent
Li et al.

(10) Patent No.: US 12,025,716 B2
(45) Date of Patent: Jul. 2, 2024

(54) GNSS EMERGENCY MONITORING ERROR SUPPRESSION METHOD FOR ALPINE CANYON COMPLEX ENVIRONMENT

(71) Applicant: Powerchina Northwest Engineering Corporation Limited, Xi'an (CN)

(72) Inventors: Zufeng Li, Xi'an (CN); Heng Zhou, Xi'an (CN); Shuwen Yang, Xi'an (CN); Haixing Shang, Xi'an (CN); Gangyi Zhao, Xi'an (CN); Zhixuan Miao, Xi'an (CN); Qun Zhang, Xi'an (CN); Guangjun Yi, Xi'an (CN); Wei Ren, Xi'an (CN); ShengXue Ke, Xi'an (CN); Ruixue Li, Xi'an (CN)

(73) Assignee: Powerchina Northwest Engineering Corporation Limited, Xi'an (CN)

( * ) Notice: Subject to any disclaimer, the term of this patent is extended or adjusted under 35 U.S.C. 154(b) by 0 days.

(21) Appl. No.: 18/463,315

(22) Filed: Sep. 8, 2023

(65) Prior Publication Data
US 2024/0118430 A1    Apr. 11, 2024

(30) Foreign Application Priority Data
Sep. 27, 2022    (CN) .......................... 202211180089.5

(51) Int. Cl.
*G01S 19/40*    (2010.01)
*G01S 19/17*    (2010.01)
(Continued)

(52) U.S. Cl.
CPC .............. *G01S 19/40* (2013.01); *G01S 19/17* (2013.01); *G01S 19/23* (2013.01); *G01S 19/07* (2013.01); *G01S 19/22* (2013.01)

(58) Field of Classification Search
CPC .......... G01S 19/23; G01S 19/17; G01S 19/40; G01S 19/22; G01S 19/07
(Continued)

(56) References Cited

FOREIGN PATENT DOCUMENTS

| CN | 106959456 A | * | 7/2017 | ............. G01S 19/20 |
| CN | 106959456 A | | 7/2017 | |

(Continued)

OTHER PUBLICATIONS

Li Zufeng, et al, Scale Consistency Reduction of Joint Adjustment of GNSS Network and Edge and Corner Nets in Gorge Area, Water Power, Jul. 31, 2017, pp. 33-36, vol. 43, Issue.7.

*Primary Examiner* — Chuong P Nguyen

(57) ABSTRACT

A GNSS emergency monitoring error suppression method for an alpine canyon complex environment is provided. Through three steps of GNSS optimization design of the alpine canyon complex environment, derived error suppression of emergency monitoring criteria in the alpine canyon complex environment, and error suppression measurement and result correction, GNSS measurement errors in the alpine canyons can be effectively suppressed. Through improving measurement accuracy, GNSS technology can be widely applied to the alpine canyons, outstanding advantages of high efficiency and high accuracy in a coordinate transmission process of the GNSS technology are brought into full play, and a cost is effectively reduced. Meanwhile, by processing the errors of the emergency monitoring criteria, it is possible to protect workers from on-site operation risks.

5 Claims, 5 Drawing Sheets

---

GNSS optimization design of alpine canyon complex environment

↓

Establishing optimal observation combination of key observation control measurement points

↓

Derived error suppression of emergency monitoring criteria in alpine canyon complex environment

↓

Error suppression measurement and result correction

(51) Int. Cl.
*G01S 19/23* (2010.01)
*G01S 19/07* (2010.01)
*G01S 19/22* (2010.01)

(58) Field of Classification Search
USPC .... 342/352, 357.55, 357.61, 357.62, 357.23, 342/357.44
See application file for complete search history.

(56) References Cited

FOREIGN PATENT DOCUMENTS

| | | | | |
|---|---|---|---|---|
| CN | 114966779 A | * | 8/2022 | ............. G01S 19/42 |
| CN | 114994714 A | * | 9/2022 | ............. G01S 19/14 |
| CN | 115015969 A | * | 9/2022 | ............. G01S 19/08 |
| CN | 115267830 A | * | 11/2022 | ............. G01S 19/42 |

* cited by examiner (a) GPS satellite sky view (b) BD satellite sky view

GNSS EMERGENCY MONITORING ERROR SUPPRESSION METHOD FOR ALPINE CANYON COMPLEX ENVIRONMENT

TECHNICAL FIELD

The disclosure relates to the field of global navigation satellite system (GNSS) deformation monitoring and data processing technologies, particularly to a GNSS emergency monitoring error suppression method for an alpine canyon complex environment.

BACKGROUND

A development of high-precision GNSS positioning navigation technology gradually becomes one of modern advanced and convenient disaster relief methods, and plays an important role in monitoring and preventing natural disasters such as disaster weather and ionospheric activity forecasting, earthquake, volcano, landslide, and ground subsidence, disaster investigation and evaluation, and emergency rescue. Therefore, it is of great importance to improve an accuracy of GNSS engineering measurement. Main sources of errors affecting positioning results in the high-precision positioning is divided into errors related to satellites, errors related to signal propagation paths, and errors related to receivers and measurement stations. Furthermore, errors related to measurement devices for ground working include two types of errors, i.e., time-dependent errors, and noise-based errors.

The GNSS measurement technology is limited by environmental effects, air observation, and other conditions, and its precision is difficult to meet engineering measurement requirements. At present, many projects under construction or to-be-built are located in a complex environment of alpine canyons. Therefore, in view of the complex conditions of alpine canyons, visibility of the satellites is hindered by terrain and ground objects surrounding the receiver. When the conditions are severe, even sufficient satellite signals cannot be received, making it impossible to achieve the positioning operation.

The deficiencies in the related art are that the complex environment of the alpine canyons is not taken into account, and a specific monitoring error suppression method for the alpine canyon complex environment is lacked, which results in a large error in the measurement accuracy, and further affects subsequent engineering measurement and deformation monitoring quality.

SUMMARY

An objective of the disclosure is to provide a global navigation satellite system (GNSS) emergency monitoring error suppression method for an alpine canyon complex environment, which inhibits errors of GNSS engineering measurement and deformation monitoring in the alpine canyon complex environment.

A technical solution adopted by the disclosure is a GNSS emergency monitoring error suppression method for an alpine canyon complex environment, including the following steps:

step 1, GNSS optimization design of the alpine canyon complex environment;

step 2, based on the step 1, establishing an optimal observation combination of key observation control measurement points;

step 3, derived error suppression of emergency monitoring criteria in the alpine canyon complex environment, including: performing, according to the optimal observation combination determined in the step 2, a rapid layout and construction of monitoring criteria, a coordinate assignment of the emergency monitoring criteria, and a switch between the emergency monitoring criteria and permanent monitoring criteria; step 4, error suppression measurement and result correction, including: based on data processing principles, performing error suppression and monitoring result correction on the alpine canyon complex environment according to data obtained from the step 1 to the step 3.

In an embodiment, the method further includes: obtaining target data (i.e., reduction result after data reduction) after the performing error suppression and monitoring result correction on the alpine canyon complex environment to correct coordinates of a deformation monitoring point of a GNSS monitoring network of the alpine canyon complex environment, increasing a number of shared satellites of the GNSS monitoring network of the alpine canyon complex environment according to the GNSS optimization design; positioning the alpine canyon complex environment according to the corrected GNSS monitoring network, thereby monitoring and preventing natural disasters of the alpine canyon complex environment and suppressing impacts of comprehensive errors, such as GNSS monitoring network errors, atmospheric delays, and multipath on monitoring results of the GNSS monitoring network.

In an embodiment, in the step 1, the GNSS optimization design includes: an optimization design of a monitoring network, a datum point layout considering the alpine canyon complex environment, and a measurement network design of the alpine canyon complex environment.

In an embodiment, the datum point layout considering the alpine canyon complex environment includes the following steps:

step 11, establishing an optimal model for baseline synchronous observation conditions and satellite visible boundary constraints;

step 12, performing a baseline shared satellite analysis according to the optimal model and the satellite visible boundary constraints;

step 13, calculating a satellite spatial position and performing a coordinate transformation of a center of an observation station;

step 14, performing a satellite visibility analysis based on the calculated satellite spatial position and a satellite occlusion height angel of the observation station;

step 15, estimating a dilution of precision (DOP) and a relative dilution of precision (RDOP) based on the satellite visible boundary constraints, the baseline shared satellite analysis, the satellite visibility analysis, and an observing period; and step 16, screening a synchronous observation combination of a target observation point according to the estimated RDOP.

In an embodiment, the establishing an optimal observation combination of key observation control measurement points further includes: estimating DOP values of the key observation control measurement points, sorting the DOP values, and then comprehensively considering a network shape and traffic conditions, thereby establishing the optimal observation combination.

In an embodiment, in the step 3, when performing the switch between the emergency monitoring criteria and permanent monitoring criteria, existed differences are three translation parameters.

In an embodiment, a calculation of the three translation parameters includes: calculating coordinates of an emergency monitoring datum point through a permanent datum point, thereby calculating the three translation parameters DX, DY, and DZ.

In an embodiment, in the step 4, the data processing principles include: using an international terrestrial reference frame (ITRF), using a same precise ephemeris, using a same processing software system, and using unified criteria and constraints.

In an embodiment, in the step 4, the error suppression measurement includes: visible satellite filtering, performing length relationship calculation on filtered baselines, and correcting coordinates of a deformation monitoring point according to the length relationship calculation.

In an embodiment, the performing error suppression and monitoring result correction on the alpine canyon complex environment includes the following steps:

step 41, calculating a length ratio $L_{ir}$ containing an error and a theoretical length ratio $L_{it}$ calculated based on a reduction formula;

step 42, calculating a length ratio difference $\Delta L_i$ between the length ratio $L_{ir}$ and the theoretical length ratio $L_{it}$, and calculating an optimal valuation $\widehat{\Delta L}$ of the length ratio difference $\Delta L_i$ through a robust estimation method;

step 43, optimizing ellipsoid parameters of GNSS adjustment; and step 44, performing reduction and analysis on monitoring results with additional length correction.

In an embodiment, the step 44 includes the following steps:

performing automatic monitoring to obtain a plurality of datum points and determining n numbers of initial edge lengths corresponding to the plurality of datum points;

calculating n numbers of L values: $L_1, L_2, L_3, \ldots, L_n$ according to the following formula:

$$L = \frac{D_{ab}}{DG_{ab}};$$

where L represents a length ratio, $D_{ab}$ represents a precise measured edge length, and $DG_{ab}$ represents a GNSS result-based inversely calculated edge length;

averaging the n numbers of L values to obtain a mean value according to the following formula: $\overline{L_n} = (L_1 + L_2 + L_3 + \ldots + L_n)/n$;

scaling vectors of the deformation monitoring point according to coordinate differences $\Delta X_{Ai}, \Delta Y_{Ai}, \Delta Z_{Ai}$ measured by the deformation monitoring point relative to a starting point A and the obtained $\overline{L_n}$ through the following formula:

$X_i = X_A + \overline{L_n} \cdot \Delta X_{Ai}$ $Y_i = Y_A + \overline{L_n} \cdot \Delta Y_{Ai}$; where $(X_i, Y_i, Z_i)$ represents coordinates of the deformation $Z_i = Z_A + \overline{L_n} \cdot \Delta Z_{Ai}$ monitoring point and $(X_A, Y_A, Z_A)$ represents coordinates of the starting point A; and importing the coordinates of the deformation monitoring point into adjustment software to perform data reduction.

Beneficial effects of the disclosure are as follows.

According to the GNSS emergency monitoring error suppression method for the alpine canyon complex environment provided by the disclosure, the errors of GNSS engineering measurement and deformation monitoring in the alpine canyon complex environment are suppressed through three steps, i.e., the GNSS optimization design of the alpine canyon complex environment, the derived error suppression of emergency monitoring criteria in the alpine canyon complex environment, and error suppression measurement and result correction. The disclosure fully considers the satellite occlusion situation in the alpine canyon complex environment, takes the network shape and the traffic conditions into account to determine the optimal observation baselines according to the formulated observing period, thereafter establishing the optimal observation combination. Meanwhile, the disclosure comprehensively considers the rapid layout and construction of the monitoring criteria, the coordinate assignment of the emergency monitoring criteria, and the switch between the emergency monitoring criteria and the permanent monitoring criteria, which further improves coordinate accuracy. During the error suppression measurement and result correction, the additional length correction is used to eliminate criteria differences and error effects. Furthermore, a reduction method adopted precise ranging edge length (also referred to the precise measured edge length) as length criteria unifies the scales of the GNSS result-based inversely calculated edge length and the precise measured edge length, thereby improving the measurement accuracy. Through the improvement of the measurement accuracy, the GNSS technology can be widely applied to the alpine canyons, the outstanding advantages of high efficiency and high accuracy in the coordinate transmission process of the GNSS technology are brought into full play, and the cost is effectively reduced. By processing the errors of the emergency monitoring criteria, it is possible to protect workers from on-site operation risks. Moreover, during monitoring the alpine canyon complex environment, the filtered baselines are performed the length relationship calculation (i.e., the length ratio difference), and then the deformation monitoring point of the monitoring network is corrected according to the length relationship calculation, thereby suppressing atmospheric delay, multipath, diffraction, and model errors at the monitoring point, unifying the scale criteria of the multiple source monitoring data, and improving the accuracy of combined adjustment.

DETAILED DESCRIPTION OF EMBODIMENTS

The disclosure will be described in detail below with reference to attached drawings and embodiments.

Figure 1:
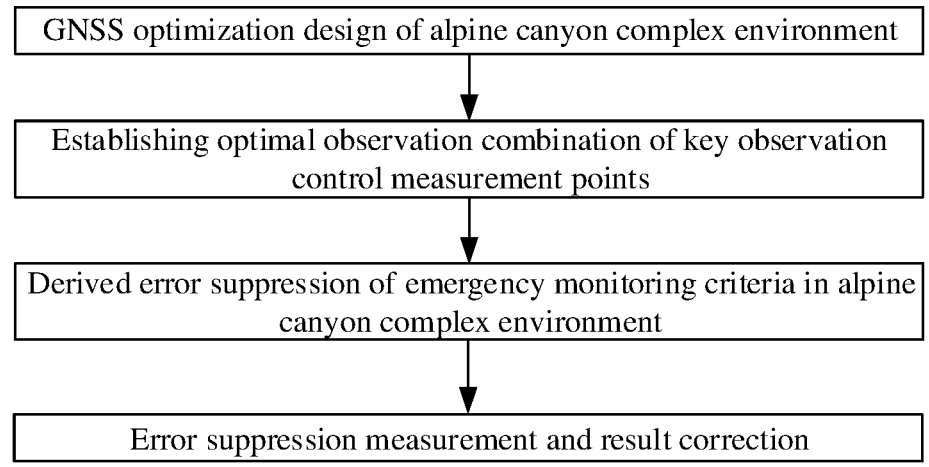
FIG. 1 illustrates a flowchart of the disclosure.

Referring to FIG. 1, the disclosure provides a global navigation satellite system (GNSS) emergency monitoring error suppression method for an alpine canyon complex environment, including the following steps.

Step 1 of GNSS Optimization Design Method Considering the Alpine Canyon Complex Environment.

(1) An optimization design of a monitoring network: firstly, some quality indicators are provided according to use and characteristics of the monitoring network, and then the monitoring network is designed according to these indicators. According to basic principles of GNSS positioning and analysis of factors influencing the GNSS positioning, the quality of the GNSS monitoring network mainly depends on a joint network shape combined satellites with ground monitoring points, an optimal observation quantity, the number of independent baselines and corresponding connection modes. Therefore, an optimal design classification of a conventional network is used for the GNSS monitoring network, and the GNSS optimization design mainly includes the following designs:

1) Criteria design: criteria of the monitoring network are the basis for deformation analysis, and if there are no stable, reliable, and unified criteria, it is impossible to obtain correct and reliable deformation analysis results, resulting in neglecting or exaggerating a safety assessment of the deformation, thereby causing an enormous or slight economic loss, and therefore, it is very important to select the suitable criteria for the GNSS deformation monitoring network.

2) Network structure design: according to character analysis of GNSS measurement technology, the quality of the network structure design is influenced by the number of network baselines and the connection mode of the baselines. Therefore, the network structure design mainly includes the number of the network baselines and the optimal connection mode.

3) Observation scheme design: obtaining a high-quality and reliable adjustment observation value is an important guarantee for the deformation analysis. Optimizing the adjustment observation value can be considered from two aspects: one is an optimization of GNSS original observation data, which refers to eliminating gross errors and weakening system errors, such as detection and repair of cycle slip and various system error correction; and another one is an optimization processing of baseline network adjustment, including: obtaining baseline data used in the network adjustment after optimizing and processing the original observation data, effective treatment of the inevitable gross errors in the baselines, and handling inconsistencies in observation accuracy.

(2) A datum point layout of the alpine canyon complex environment.

Hydropower engineering and general landslide geological disaster projects are generally constructed in high mountains and canyons, and in these areas, due to the limitation of environmental boundary constraints, the number of satellites that can be received by ground receiving devices is limited. Therefore, a dilution of precision (DOP) value of the measurement point cannot be determined precisely according to the existed methods. It is of great need to establish a digital elevation model (DEM), and then the DOP value of a ground observation station at any time period can be calculated based on the DEM and satellite orbit parameters. Furthermore, the datum point layout of the alpine canyon complex environment specially includes the following steps:

(2-1) establishing an optimal model for baseline synchronous observation conditions and satellite visible boundary constraints;

(2-2) performing a baseline shared satellite analysis according to the optimal model and the satellite visible boundary constraints;

(2-3) calculating a satellite spatial position and performing a coordinate transformation of a center of an observation station;

(2-4) performing a satellite visibility analysis based on the calculated satellite spatial position and a satellite occlusion height angel of the observation station;

(2-5) estimating a DOP and a relative dilution of precision (RDOP) based on the satellite visible boundary constraints, the baseline shared satellite analysis, the satellite visibility analysis, and an observing period; and (2-6) screening a synchronous observation combination of a target observation point according to the estimated RDOP.

For the landslide, after a monitoring plan and a monitoring target are determined, a deformation point (also referred to deformation monitoring point) layout is basically determined, and the deformation point layout is generally considered to be non-adjustable, and then other work needs to be performed based on the deformation point layout, including a datum point selection, formulation of the observation scheme, etc. In general, based on the deformation monitoring points as the criteria, the synchronous observation combination of the target observation point is screened according to the calculated baseline DOP, i.e., ($DOP_{Ax}$, $DOP_{Ay}$, $DOP_{Az}$). And then, DOP values of the deformation monitoring point relative to various preset datum points (i.e., the points in the synchronous observation combination) under different observing periods are calculated on the basis of the deformation monitoring point of the monitoring network as the datum point. The n numbers of points with optimal DOP values are obtained based on the screened network conditions and the observing period, and then, the datum point is selected from the n points according to on-site environment, thereafter correspondingly selecting the synchronous observation points and the observing period.

A method for selecting the synchronous observation points and the observing period is specifically as follows.

Overall accuracy statistics of the observation scheme is supported. After the observation scheme is determined, statistical information such as the baseline shared satellite visibility and the DOP values in multiple observing periods is given. And then, the accuracy information of the different observing periods and different baselines is summarized.

Baseline setting and combination are performed based on matching degree of the DOP values within the same observing period, and the multiple observation schemes are evaluated to obtain the optimal observation scheme, including a sequence of the synchronous observation points, start and end time of the observing period, and baseline information, thereafter formulating the corresponding observation scheme.

A synchronous network construction of a difficult observation target point with $DOP_d$ is recommended, including: establishing a virtual synchronous observation relationship between the difficult observation target point and the n points of the constructed network to obtain DOP values of the various baselines, i.e., $DOP_{d-1}$, $DOP_{d-2}$, . . . , $DOP_{d-i}$, . . . $DOP_{d-n}$.

The above obtained DOP values are sorted in ascending order, and R points are sequentially intercepted as the optimal synchronous observation baselines according to a number R of the devices.

According to the above accuracy analysis results combined with the on-site terrain and the traffic conditions, the layout of each datum point is determined under manual intervention, and is also used as references of the formulated observation scheme.

(3) A measurement network design of the alpine canyon complex environment.

The multiple monitoring points of the monitoring network should be selected on representative cross sections and parts of the landslide, which have good GNSS observation conditions. The multiple monitoring points should be buried into corresponding observation piers and forced to be centered respectively, and if a vertical displacement monitoring is performed by using a conventional leveling method, it is also necessary to set a leveling sign on a base of the observation pier to form a vertical displacement monitoring network. During selecting the monitoring points, a geological engineer responsible for geological survey in this region participates, and the monitoring points need to be confirmed by the geological engineer or other related professional technicians, and then can be buried. Other contents are similar to those of the control network (also referred to the above mentioned monitoring network) design, and details are not described again.

Step 2 of Establishing an Optimal Observation Combination of Key Observation Control Measurement Points The key observation control measurement points refer to control points that are severely obstructed by GNSS signals from high mountains in the canyons or buildings in urban environment, and also refer to the measurement points that require key control of their observation quality during the observation.

Figure 2A:
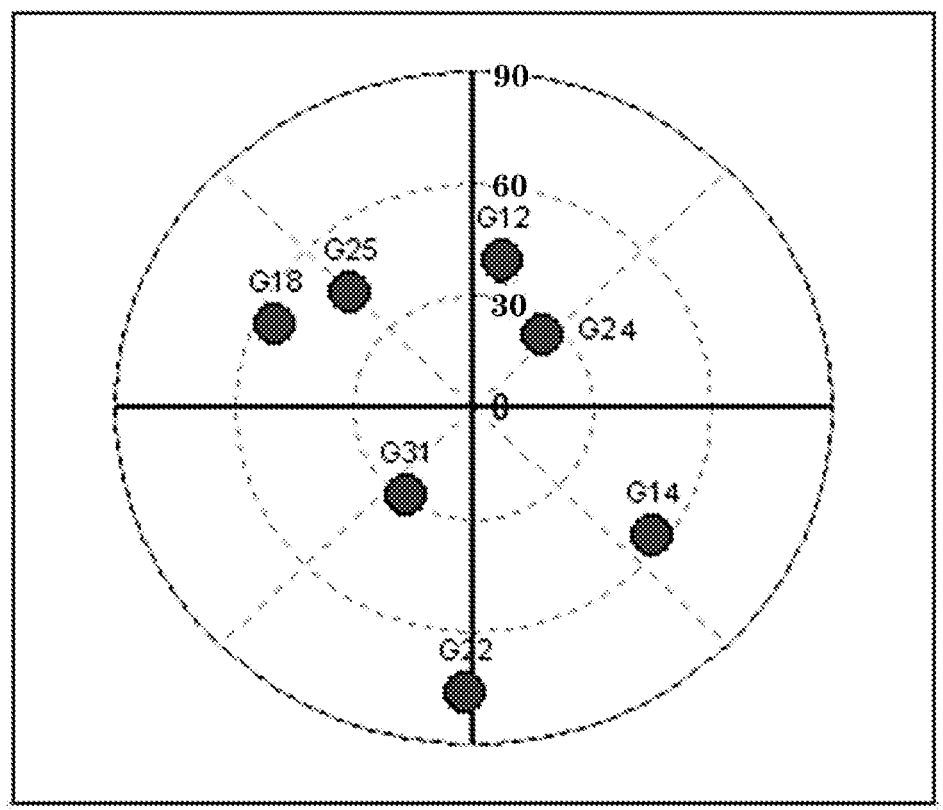
FIG. 2A illustrates a sky view at a specific period according to a global positioning system (GPS) satellite.
Figure 2B:
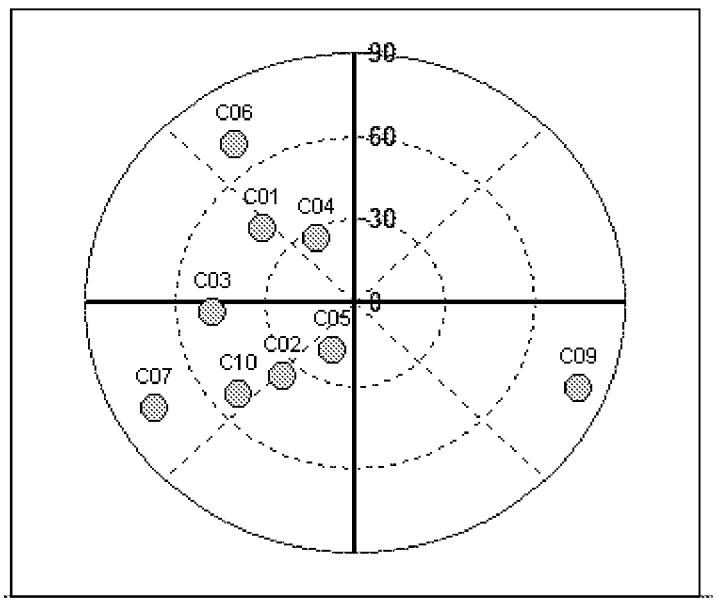
FIG. 2B illustrates a sky view at the specific period according to a beidou (BD) satellite.
Figure 3A:
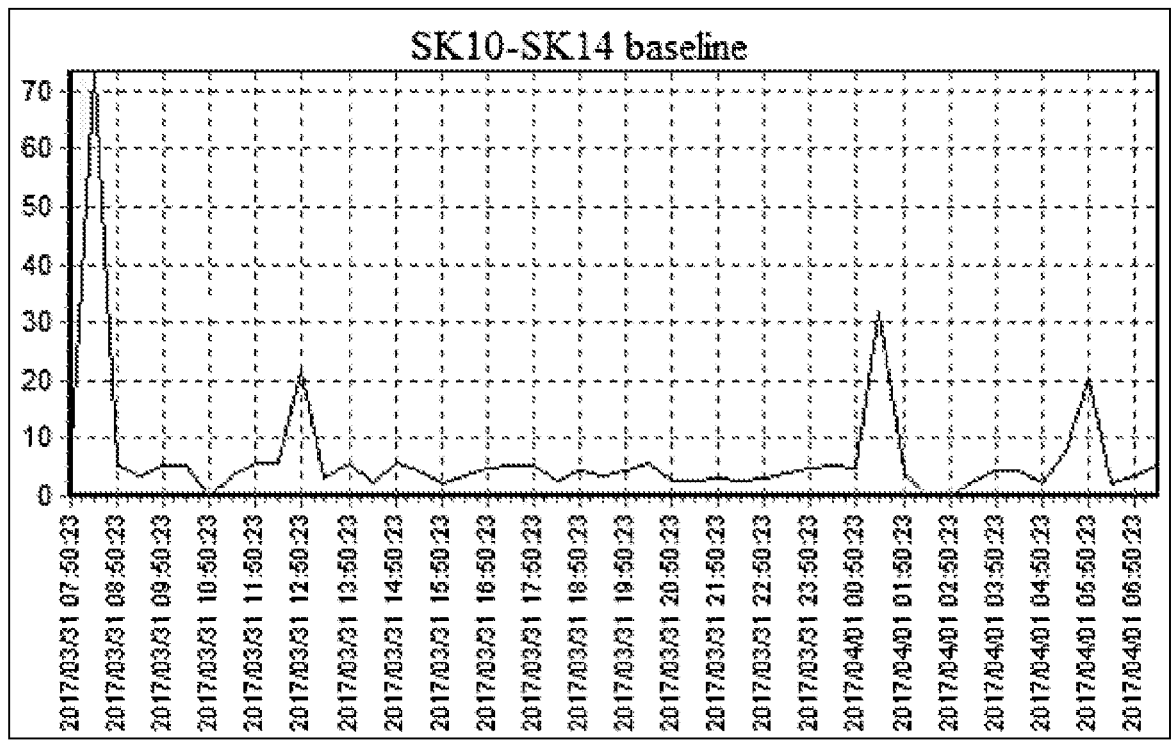
FIGS. 3A to 3D illustrate line charts of relative dilution of precision (RDOP) values of synchronous observation baselines over time.
Figure 3B:
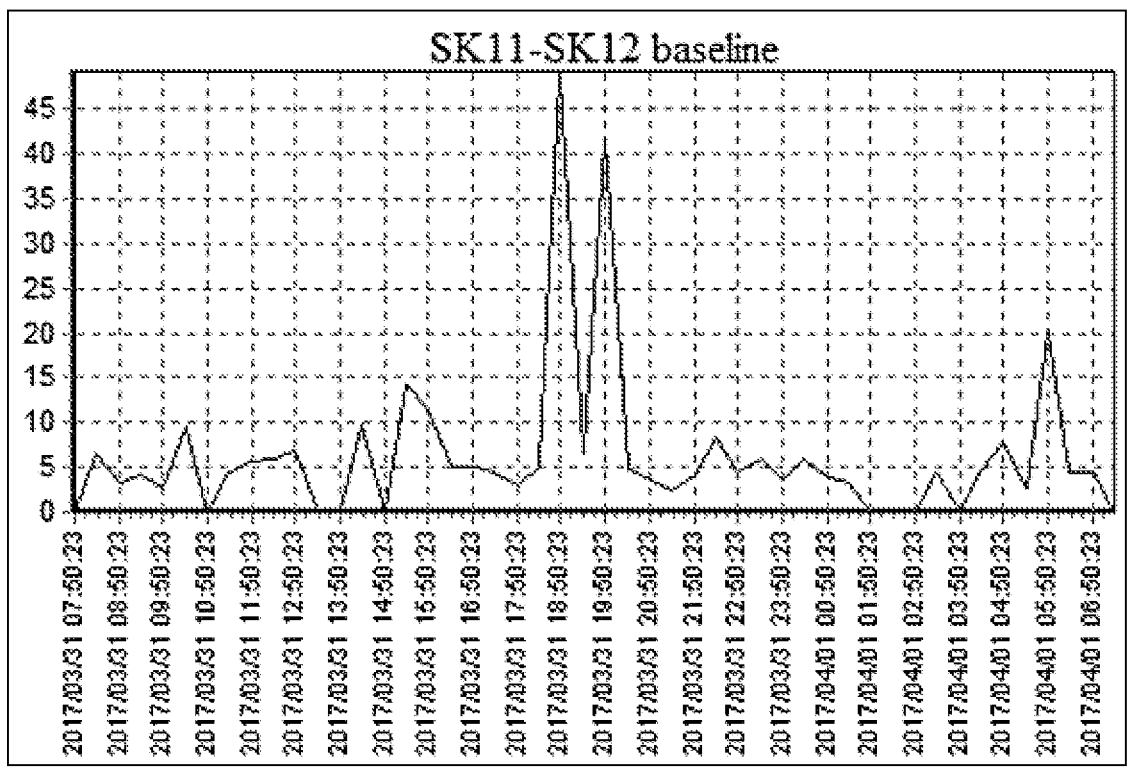
Figure 3C:
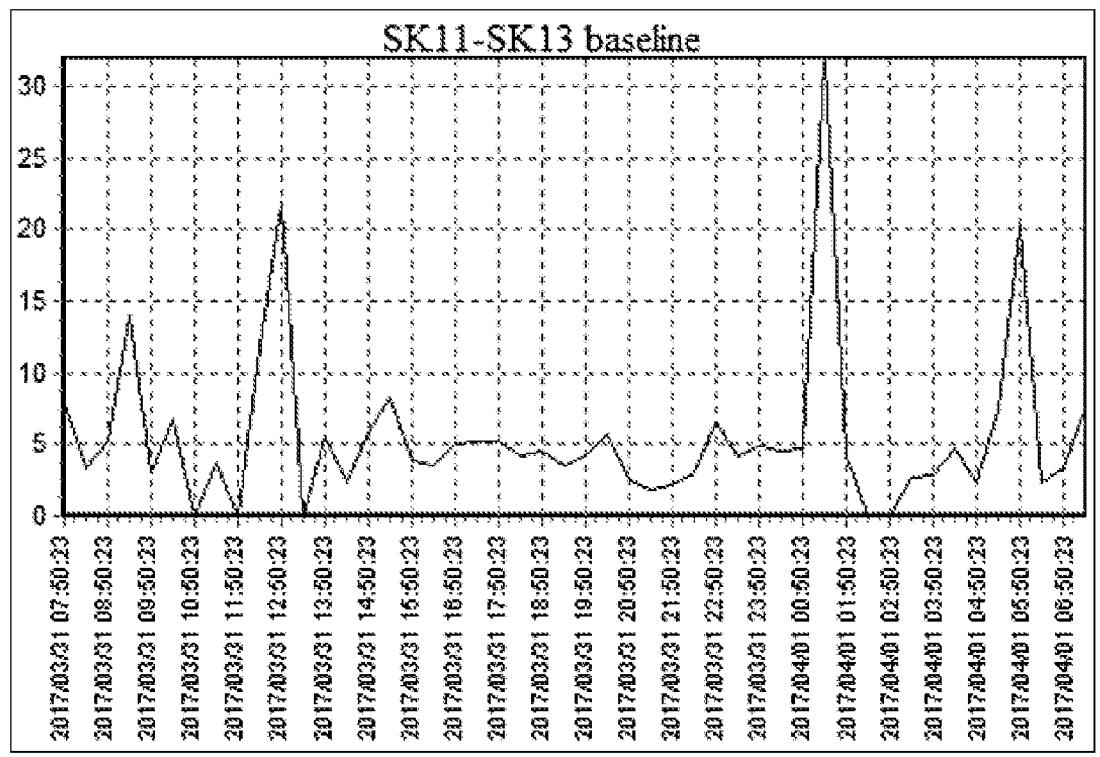
Figure 3D:
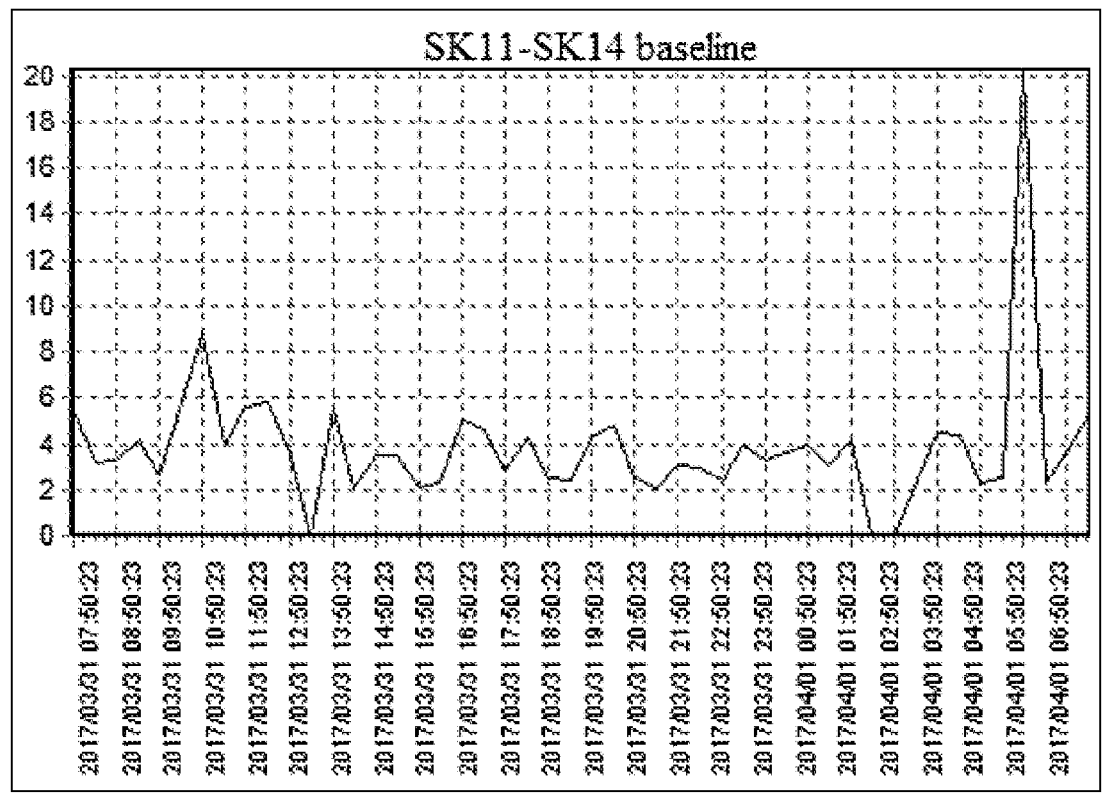

On the basis of the step 1, first, the measurement points with severe occlusion are screened out based on the terrain conditions, and then these measurement points are sequentially performed the RDOP value evaluation relative to the related points (also referred to the datum points) based on the satellite occlusion boundary constraints. FIGS. 2A-2B illustrate the evaluation of the selected key observation control measurement points for a certain project, and FIGS. 2A-2B illustrate a satellite sky view in a certain time period, where FIG. 2A illustrates a global positioning system (GPS) satellite sky view, and FIG. 2B illustrates a beidou (BD) satellite sky view.

Then, the RDOP values between the key observation control measurement points and the related points are sorted to obtain line graphs of the RDOP values changing with the observation time periods as shown in FIG. 3A to FIG. 3D. Based on the formulated observing period, the optimal observation baselines can be obtained in the line graph by comprehensively considering the network shape and the traffic conditions, thereby establishing the optimal observation combination.

Finally, control network accuracy estimation is carried out, including: estimating the accuracy according to the optimal baseline combination and the baselines, performing the control network accuracy estimation by using a method to simulate the baselines, and obtaining estimated three-dimensional coordinate accuracy as shown in Table 1.

TABLE 1 estimation of spatial coordinate accuracy and comparison with measured values

| Point name | Estimation accuracy | | | | Actual measured accuracy | | | |
|---|---|---|---|---|---|---|---|---|
| | Mx (cm) | My (cm) | Mz (cm) | Mp (cm) | Mx (cm) | My (cm) | Mz (cm) | Mp (cm) |
| SK01 | 0.20 | 0.24 | 0.18 | 0.36 | 0.14 | 0.19 | 0.17 | 0.29 |
| SK06 | 0.15 | 0.20 | 0.17 | 0.30 | 0.12 | 0.16 | 0.15 | 0.25 |
| SK07 | 0.15 | 0.20 | 0.15 | 0.29 | 0.13 | 0.18 | 0.17 | 0.28 |
| SK08 | 0.15 | 0.20 | 0.15 | 0.30 | 0.14 | 0.22 | 0.17 | 0.31 |
| SK15 | 0.36 | 0.32 | 0.24 | 0.54 | 0.11 | 0.14 | 0.14 | 0.23 |
| SK16 | 0.38 | 0.33 | 0.26 | 0.56 | 0.16 | 0.19 | 0.2 | 0.32 |
| SK17 | 0.36 | 0.32 | 0.24 | 0.54 | 0.11 | 0.13 | 0.13 | 0.22 |
| SK18 | 0.36 | 0.32 | 0.24 | 0.54 | 0.11 | 0.13 | 0.13 | 0.22 |
| SK19 | 0.38 | 0.35 | 0.26 | 0.57 | 0.1 | 0.13 | 0.13 | 0.21 |
| SK20 | 0.38 | 0.35 | 0.27 | 0.57 | 0.11 | 0.14 | 0.14 | 0.22 |
| SK21 | 0.20 | 0.24 | 0.18 | 0.36 | 0.15 | 0.25 | 0.2 | 0.36 |
| SK22 | 0.18 | 0.23 | 0.18 | 0.35 | 0.14 | 0.2 | 0.18 | 0.31 |
| SK23 | 0.18 | 0.23 | 0.18 | 0.35 | 0.16 | 0.25 | 0.2 | 0.36 |
| SK24 | 0.20 | 0.23 | 0.18 | 0.35 | 0.15 | 0.21 | 0.19 | 0.32 |

Step 3 of Derived Error Suppression of Emergency Monitoring Criteria in the Alpine Canyon Complex Environment For an emergency monitoring project, it is generally difficult to quickly establish deformation monitoring criteria that meets standards. Therefore, it is necessary to quickly establish temporary monitoring criteria and maintain its effectiveness. The emergency monitoring criteria generally considers short-term maintenance of the criteria only. As for medium to long-term maintenance of the criteria, the criteria need to be constructed according to the permanent criteria requirements, and finally the emergency monitoring criteria can be switched to the permanent monitoring criteria. It is necessary to ensure that when the emergency monitoring criteria are switched to the permanent monitoring criteria, heights of the monitoring criteria are kept uniform, and the accuracy of the emergency monitoring criteria is effectively controlled. Therefore, the establishment of the emergency monitoring criteria needs to comprehensively consider the rapid layout and construction of the monitoring criteria, the coordinate assignment of the emergency monitoring criteria, and the switch between the emergency monitoring criteria and the permanent monitoring criteria according to the optimal observation combination determined in the step 2.

(1) Layout and Construction of the Emergency Monitoring Criteria

Figure 4:
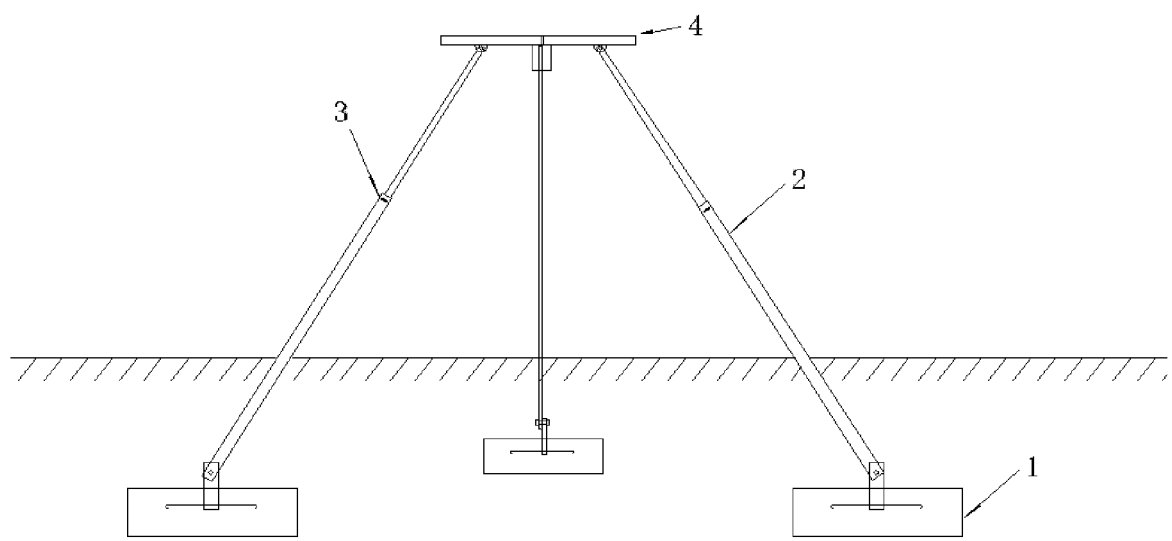
FIG. 4 illustrates a schematic diagram of an emergency monitoring device for soft soil foundation.

The position of the monitoring criteria layout is selected around the monitoring target area, and different monitoring criteria layout modes are designed according to different fundamental conditions. For a soil foundation, multiple fixed anchors can be rammed into the foundation, and then the datum points are installed based on the anchors, followed by backfilling on the foundation, so that the monitoring criteria can be completed within one hour. In addition, if the monitoring criteria are used for the medium to long-term monitoring, secondary pouring can be carried out by adopting materials such as concrete. The installation mode of a rock foundation is relatively simple, expansion screws can be implanted in opening holes of the rock foundation, thereby fixing the designed universal fixtures. The emergency monitoring criteria can adopt an assumed coordinate system, or approximate local coordinate system results. Referring to FIG. 4, an embodiment of the disclosure provides a position layout method for the emergency monitoring criteria suitable for the soft soil foundation as follows.

The emergency monitoring device for the soft soil foundation includes foundation embedded parts 1, each foundation embedded part 1 is rotationally provided with a telescopic bracket 2. The telescopic bracket 2 has two sections that are sleeved together, and the two sections of the telescopic bracket 2 are fixedly connected through a mechanical fixing screw 3. In an embodiment of the disclosure, a number of the telescopic bracket 2 is three and upper ends of the three telescopic brackets 2 are connected with a forced centering disc 4. When the emergency monitoring device is used, a foundation pit is excavated firstly, the emergency monitoring device for the soft soil foundation is placed in, and then the telescopic bracket 2 is adjusted to a proper height, thereafter backfilling the soft soil, thereby completing the layout of the emergency monitoring device for the soft soil foundation.

For the rock or other hard foundations, the datum points are directly anchored through a drilling manner.

(2) The coordinate assignment of the emergency monitoring criteria is conventional technical means, and details are not described herein again.

(3) The switch between the emergency monitoring criteria and the permanent monitoring criteria includes the following steps.

The relative relationship is accurately determined, except that a static relative relationship needs to be established, the emergency monitoring criteria should also be brought into the monitoring range of the permanent monitoring criteria to perform a cycle of tracking so as to confirm the stability of the emergency monitoring criteria. If the emergency monitoring criteria have an unstable tendency, it is necessary to analyze deformation rules of the emergency monitoring criteria and evaluate the reliability of early-stage monitoring data. If necessary, the early-stage monitoring data needs to be calibrated.

In order to maintain the effective switch and data continuity, it is necessary to ensure that the coordinate transmission accuracy between the emergency monitoring emergency monitoring criteria and the permanent monitoring criteria is as high as possible, but conversion parameters used by the two monitoring criteria should be consistent. However, there are errors existed in the coordinate transmission, resulting in inevitable differences, which reflect on three translation parameters embodied in seven parameters. In the seven parameters, three rotation parameters and a length parameter have no significant differences. Furthermore, the three translation parameters can be calculated by using one of the control points. Namely, coordinates of the datum point of the emergency monitoring criteria can be calculated by a datum point of the permanent monitoring criteria, i.e., obtaining the three translation parameters DX, DY, and DZ, followed by using the three translation parameters DX, DY, and DZ to correct the permanent monitoring criteria, thereby keeping the uniform height of the monitoring data before and after.

Step 4 of Error Suppression Measurement and Result Correction

The step 4 includes: based on data processing principles, performing error suppression and monitoring result correction on the alpine canyon complex environment according to data obtained from the step 1 to the step 3.

(1) Data Processing Principles

When processing the GNSS monitoring data, main considerations include: a reference frame, ephemeris, software, reference criteria, determination of the constraints, a precision analysis method, etc. However, among them, the selection of the reference criteria and the determination of the constraints are the most important. For the GNSS monitoring network that needs to monitor multi-stage observation results, when a data processing scheme is formulated, the following principles should generally be followed.

1) Adopting an International Terrestrial Reference Frame (ITRF)

The reference frame is a basis for the GNSS data processing, that is, before performing the data processing, it is necessary to first determine what reference frame is to be employed. Due to the earth's lithosphere being in motion and change, the positions of the various points in the GNSS monitoring network are constantly changing. Thus, the coordinate frame (also referred to the reference frame) adopted must be a globally unified and continuously refined frame. The current reference frame with these conditions can only be determined as international earth Reference system, i.e., the ITRF. When processing the GNSS data, it is important to use the latest ITRF and promptly convert past processing results into the latest ITRF results.

2) Using a Same High-Precision Precise Ephemeris

Using different precise ephemeris can result in certain differences in the processing results. In order to facilitate analysis and research, the same precise ephemeris should be used for processing the GNSS observation results of different periods.

3) Adopting an Advanced Same Processing Software System

In order to obtain the best processing results, it is necessary to use the most advanced GNSS processing software. At the same time, in order to maintain consistency in the processing results, the same processing software system should be used for the multi-stage GNSS observation results during processing.

4) Adopting a Unified Data Processing Scheme

When processing the observation data of the GNSS terrain deformation monitoring network, there are multiple processing schemes, and there are inevitable system differences between different processing schemes. In order to solve the deformation values reflected by the multi-stage observation results, a "unified" data processing scheme must be adopted.

(2) Error Suppression Based on the Alpine Canyon Complex Environment

The error suppression measurement for the alpine canyon complex environment specifically includes: visible satellite filtering, performing length relationship calculation on filtered baselines, and correcting coordinates of a deformation monitoring point according to the length relationship calculation.

Figure 5:
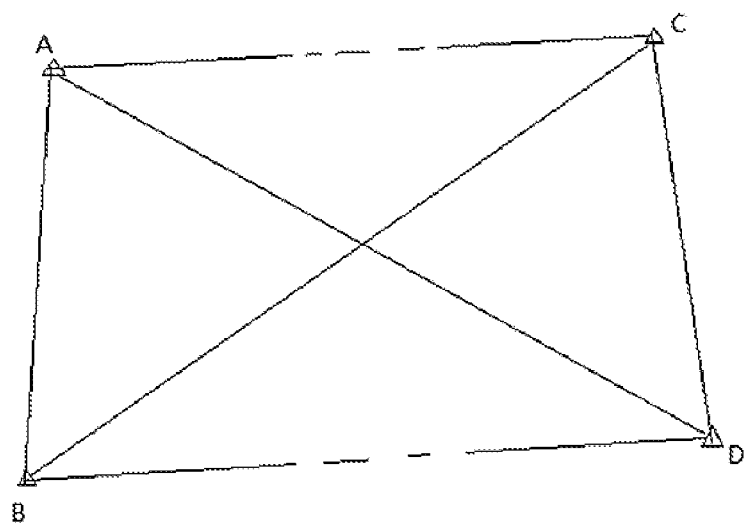
FIG. 5 illustrates a calibrated schematic diagram of a monitoring network.

When using the GNSS technology to monitor the deformation network, as shown in FIG. 5, two points of A and B are used as the datum points. During the calculation process, the visible satellite filtering is performed on the baseline AB satellite referring to the monitoring baselines AC, BD, and other related baselines. The length relationship is calculated by using the filtered baselines and the coordinates of the deformation monitoring point are corrected accordingly.

The concept of length ratio and the length ratio in the calculation of the above length relationship are similar. Two known points of A and B are set, a distance between the A point and the B point is measured to obtain a precise measured edge length $D_{ab}$ and a GNSS result-based inversely calculated edge length $DG_{ab}$, and a ratio L between the $D_{ab}$ and the $DG_{ab}$ is calculated, and the ratio L is defined as the length ratio, i.e., $$L = \frac{D_{ab}}{DG_{ab}}.$$

Scaling is performed on the length ratio of the edge length according to the determined length ratio L, and the GNSS engineering control network meeting a certain precision can be obtained by combining translation and rotation transformation.

(3) Deformation Monitoring Result Correction Based on Using the Precise Measured Edge Length as Length Criteria Due to the fact that the GNSS measurement accuracy is generally lower than the precise measured accuracy in the alpine canyon regions, monitoring in these regions requires using the reduction method based on length consistency, thereby to unify the lengths of the GNSS measurement accuracy and the precise measured accuracy, which specially includes the following steps.

1) Calculating a Length Ratio $L_{ir}$ Containing an Error and a Theoretical Length Ratio $L_{it}$ Calculated Based on a Reduction Formula In order to verify theoretical correctness of the length ratio residual analysis in the deformation monitoring analysis, deformation monitoring data of a reservoir is used as criteria, and the length ratio residual analysis theory is used to process the two-stage monitoring data of the reservoir. In order to facilitate comparative analysis, a smooth dam section is selected.

The GNSS leveling monitoring data between some of the monitoring points and the working datum points is selected to perform inverse calculation to compare with the precise measured edge length data of the total station. As shown in Table 2, edge name contains the points participated in the calculation of the length ratio residuals, $Y_m$ represents a distance between a center point of the edge length and a central meridian, and ΔL represents a length ratio residual term.

The two-stage monitoring data is processed, and then the length ratio $L_{ir}$ containing the error and the theoretical length ratio $L_{it}$ calculated based on the reduction formula in each stage monitoring data are calculated respectively, and the results are shown in Table 2.

Table 2 illustrates the theoretical length ratio and the precise measured length ratio of each stage monitoring data.

| Edge name | $Y_m$ | $L_{ir}$ | $L_{it}$ | ΔL |
|---|---|---|---|---|
| Calculation of first stage observation results | | | | |
| H5-D33 | 62740.367 | 1.0000029361 | 0.9999515127 | 0.0000514234 |
| H5-D23 | 62752.088 | 1.0000048507 | 0.9999514946 | 0.0000533561 |
| H5-D21 | 62896.316 | 1.0000088189 | 0.9999512714 | 0.0000575476 |
| H5-K26 | 63092.523 | 1.0000037600 | 0.9999509669 | 0.0000527931 |
| H6-D37 | 62129.175 | 1.0000073885 | 0.9999524528 | 0.0000549357 |
| D27-H6 | 62145.296 | 1.0000076715 | 0.9999524281 | 0.0000552434 |
| H6-D25 | 62245.243 | 1.0000069478 | 0.9999522749 | 0.0000546728 |
| H6-D35 | 62230.936 | 1.0000081998 | 0.9999522969 | 0.0000559029 |
| H7-D311 | 61811.006 | 1.0000087021 | 0.9999529385 | 0.0000557636 |
| H7-D211 | 61827.623 | 1.0000080362 | 0.9999529132 | 0.0000551231 |
| H7-D39 | 61836.615 | 1.0000055999 | 0.9999528995 | 0.0000527005 |
| ... | | | | |
| Calculation of second stage observation results | | | | |
| H5-D33 | 62740.372 | 1.0000056314 | 0.9999515127 | 0.0000541187 |
| H5-D23 | 62752.093 | 1.0000059555 | 0.9999514946 | 0.0000544609 |
| H5-D21 | 62896.319 | 1.0000106252 | 0.9999512714 | 0.0000593538 |
| H5-K26 | 63092.527 | 1.0000076888 | 0.9999509669 | 0.0000567219 |
| H6-D37 | 62129.184 | 1.0000103994 | 0.9999524527 | 0.0000579466 |
| D27-H6 | 62145.305 | 1.0000143287 | 0.9999524281 | 0.0000619006 |
| H6-D25 | 62245.252 | 1.0000116928 | 0.9999522749 | 0.0000594179 |
| H6-D35 | 62230.945 | 1.0000055918 | 0.9999522969 | 0.0000532949 |
| H7-D311 | 61811.015 | 1.0000032290 | 0.9999529385 | 0.0000502905 |
| H7-D211 | 61827.631 | 1.0000081932 | 0.9999529132 | 0.0000552801 |
| H7-D39 | 61836.623 | 1.0000011985 | 0.9999528995 | 0.0000482991 |
| H7-D29 | 61853.981 | 1.0000012272 | 0.9999528730 | 0.0000483541 |
| ... | ... | ... | ... | ... |

2) Calculating a length ratio difference $\Delta L_i$ between the length ratio $L_{ir}$ and the theoretical length ratio $L_{it}$, and calculating an optimal valuation $\widehat{\Delta L}$ of the length ratio difference $\Delta L_i$ through a robust estimation method according to a following formula:

$$\Delta L_i = L_{ir} - L_{it}.$$

$Y_i$ represents a spatial distribution of each edge, and then a value of the regression lien in the middle of the region is determined as the optimal valuation $\widehat{\Delta L}$.

The function relationship between the $\Delta L_i$ and the $Y_i$ based on the above idea is as follows:

$$\Delta L_i = \Delta + \varepsilon Y_i + e_i.$$

In the formula, $\Delta$ and $\varepsilon$ represent coefficients, and $e_i$ represents a random error.

Then, based on the following formula, it is determined whether there is data in the length ratio difference values that does not conform to the basic distribution rule according to the following formula:

$$\rho = \frac{\frac{1}{n}\sum_{i=1}^{n}(Y_i - \overline{Y})(\Delta L_i - \overline{\Delta L})}{\sqrt{\frac{1}{n}\sum_{i=1}^{n}(\Delta L_i - \overline{\Delta L})^2 \frac{1}{n}\sum_{i=1}^{n}(Y_i - \overline{Y})^2}}.$$

If the requirements are conformed, |ρ| is close to 1; otherwise, the abnormal data needs to be eliminated.

And then, $$\Delta L = \begin{bmatrix} \Delta L_1 \\ \Delta L_2 \\ \cdots \\ \Delta L_n \end{bmatrix}, Y = \begin{bmatrix} 1 & Y_1 \\ 1 & Y_2 \\ \cdots & \cdots \\ 1 & Y_n \end{bmatrix}, \beta = \begin{bmatrix} \Delta \\ \varepsilon \end{bmatrix}, e = \begin{bmatrix} e_1 \\ e_2 \\ \cdots \\ e_n \end{bmatrix}; \text{ and } \Delta L = Y\beta + e;$$

and the β can be calculated by using the least square method as follows:

$\beta = (Y^T PY)^{-1} Y^T P\Delta L$, followed by the following formula:

$$\begin{cases} \hat{\Delta} = \dfrac{\sum Y_i^2 \sum \Delta L_i - \sum Y_i \sum \Delta L_i Y_i}{n\sum Y_i^2 - (\sum Y_i)^2} \\ \hat{\varepsilon} = \dfrac{n\sum \Delta L_i Y_i - \sum \Delta L_i \sum Y_i}{n\sum Y_i^2 - (\sum Y_i)^2} \end{cases}.$$

Finally, the optimal valuation $\widehat{\Delta L}$ of the length ratio difference $\Delta L_i$ is obtained as follows: $\widehat{\Delta L} = \hat{\Delta} + \hat{\varepsilon}\overline{Y_M}$.

In the above formula, $Y_M$ represents an abscissa value of a central point in the monitoring area, which is calculated by the following formula: $Y_M=(Y_{min}+Y_{max})/2$, where $Y_{min}$ represent a minimum abscissa value, and $Y_{max}$=represents a maximum abscissa value.

3) Optimizing Ellipsoid Parameters of GNSS Adjustment

Based on the residual analysis theory of the length ratio and the principle of the least square method, the theoretical length ratio coefficient is calculated as follows: $v=\beta Y-L$.

In the above formula, $Y=[Y_{mi}, 1]$, where $i=1,2,3,\ldots,n$, and $Y_m$ represents the distance between the center point of the edge length and the central meridian; $L=[\Delta k_i]$, where $i=1, 2, 3, \ldots, n$; and $(Y^TPY)\beta=Y^TP\Delta L$.

In the above formula, v represents the residual term, $\beta$ represents the length ratio coefficient, Y represents the distance from the selected edge to the central meridian, $Y_m$ represents the distance between the center point of the edge length and the central meridian, L represents the corresponding length relationship, $\Delta L$ represents the residual term of the length ratio, and P represents a unit weight matrix, thereby obtaining a formula as follows:

$$(Y^TY)\beta=Y^T\Delta L, \text{ and } \beta=(Y^TY)^{-1}(Y^T\Delta L).$$

After calculation, the length ratio coefficients of the two stages of monitoring data are respectively obtained as follows:

$$\beta_1=[0.000001167680276, 0.126458355588444]; \text{ and}$$

$$\beta_2=[0.000003039817470, 0.335321436050473].$$

It is determined that $Y_m$ is 7,136 meters (m), based on this, the two-stage length ratio can be calculated as: $L_1=1.00000088$, and $L_2=1.00000235$.

In order to facilitate use in the adjustment software, the length ratio relationship needs to be equivalently converted into a projected compensating level surface according to the following formula:

$$H_m = -R\frac{1-L}{L},$$

where R represents a regional earth curvature radius.

Therefore, the compensating level surfaces of the two stages are respectively as follows:

$$H_{m1}=5.6m, \text{ and } H_{m2}=14.9m.$$

4) Performing Reduction and Analysis on Monitoring Results with Additional Length Correction Based on the length relationship obtained above, it can be used for the monitoring results reduction. Automatic monitoring is performed to obtain multiple datum points and n numbers of initial edge lengths corresponding to the plurality of datum points are determined; n numbers of L values: $L_1, L_2, L_3, \ldots, L_n$ are calculated according to the following formula:

$$L = \frac{D_{ab}}{DG_{ab}},$$

where L represents the length ratio, $D_{ab}$ represents a precise measured edge length, $DG_{ab}$ represents a GNSS result-based inversely calculated edge length; and then a mean value is obtained by averaging the n numbers of L values according to the following formula: $\overline{L_n}=(L_1+L_2+L_3+\ldots+L_n)/n$; and vectors of the deformation monitoring point are scaled according to coordinate differences $\Delta X_{Ai}, \Delta Y_{Ai}, \Delta Z_{Ai}$ measured by the deformation monitoring point relative to a starting point A and the obtained $\overline{L_n}$ through the following formula:

$$X_i=X_A+\overline{L_n}\cdot\Delta X_{Ai}$$

$$Y_i=Y_A+\overline{L_n}\cdot\Delta Y_{Ai}$$

$$Z_i=Z_A+\overline{L_n}\cdot\Delta Z_{Ai}.$$

In the above formula, $(X_i, Y_i, Z_i)$ represents coordinates of the deformation monitoring point and $(X_A, Y_A, Z_A)$ represents coordinates of the starting point A; and thereafter, the monitoring results for additional length correction have been determined.

The calculation of the length ratio mentioned above fully considers the spatial distribution of the edge lengths and the corresponding error influence, eliminates the criteria differences and the corresponding error influence, and establishes a robust estimation method.

The calculated results are then substituted into the relevant adjustment software for data reduction. In order to compare, two methods are used for the calculation, and the first is a reduction method using the precise measured edge length mentioned in the disclosure as the length criteria, where the position criteria are given based on the quasi stable processing results, and the orientation criteria are given by taking the average of multiple orientations. And the second method is a conventional method of multi-starting point constraint adjustment method. The comparison of the reduction results is shown in Table 3.

TABLE 3

| calculation of deformation using the two methods | | | | | | | |
|---|---|---|---|---|---|---|---|
| Precise measured edge length as length criteria reduction results | | | | Calculation results of GNSS network constrained adjustment | | | |
| Δx(mm) | Δy(mm) | ΔS(mm) | ΔH(mm) | Δx(mm) | Δy(mm) | ΔS(mm) | ΔH(mm) |
| 1.7 | −2.6 | 3.1 | 3.2 | −2.4 | −3.8 | 4.5 | 3.2 |
| −0.2 | −2.4 | 2.4 | 2.7 | −4.1 | −4.1 | 5.8 | 2.7 |
| −0.7 | −1.0 | 1.2 | 2.3 | −4.5 | −3.2 | 5.5 | 2.3 |
| 0.5 | −2.8 | 2.8 | 3.4 | −3.7 | −3.8 | 5.3 | 3.4 |
| 0.8 | −1.3 | 1.5 | 2.8 | −3.1 | −3.1 | 4.4 | 2.8 |
| 0.4 | −1.1 | 1.2 | 1.8 | −3.5 | −3.3 | 4.8 | 1.8 |
| 2.3 | −3.5 | 4.2 | 0.6 | −1.7 | −4.5 | 4.8 | 0.6 |
| −0.4 | −3.6 | 3.6 | 1.1 | −4.2 | −5.2 | 6.7 | 1.1 |
| −0.5 | −2.6 | 2.6 | 1.6 | −4.2 | −4.7 | 6.3 | 1.6 |

Mean square errors calculated by the method of the disclosure and the second method are ±2.88 millimeters (mm) and ±5.73 mm, respectively, which illustrates that the monitoring accuracy is significantly improved. If an assumption that the deformation does not change during the two-stage observation is valid, using the precise measured edge length as the length criteria provided by the disclosure can certainly improve the monitoring accuracy of the disclosure. Furthermore, seen from the monitoring results, the improved monitoring accuracy is basically consistent with the overall trend.

What is claimed is:

1. A global navigation satellite system (GNSS) emergency monitoring error suppression method for an alpine canyon complex environment, comprising the following steps:
   error suppression measurement and result correction, comprising: performing error suppression and monitoring result correction on the alpine canyon complex environment;
   wherein the performing error suppression and monitoring result correction on the alpine canyon complex environment comprises the following steps:
   calculating a length ratio $L_{ir}$ containing an error of an edge in a GNSS monitoring network corresponding to the alpine canyon complex environment and a theoretical length ratio $L_{it}$ of the edge in the GNSS monitoring network corresponding to the alpine canyon complex environment;
   calculating a length ratio difference $\Delta L_i$ between the length ratio $L_{ir}$ and the theoretical length ratio $L_{it}$, and calculating a valuation $\widehat{\Delta L}$ of the length ratio difference $\Delta L_i$ through a robust estimation method;
   optimizing ellipsoid parameters of GNSS adjustment; and
   determining monitoring results with additional length correction and performing data reduction on the monitoring results with additional length correction;
   wherein the determining monitoring results with additional length correction and performing data reduction on the monitoring results with additional length correction comprises:
   performing automatic monitoring to obtain a plurality of datum points and determining n numbers of initial edge lengths corresponding to the plurality of datum points;
   calculating n numbers of L values: $L_1, L_2, L_3, \ldots, L_n$ according to the following formula:

$$L = \frac{D_{ab}}{DG_{ab}};$$

wherein L represents a length ratio, $D_{ab}$ represents a measured edge length, and $DG_{ab}$ represents a GNSS result-based inversely calculated edge length;
   averaging the n numbers of L values to obtain a mean value according to the following formula:

$$\overline{L_n} = (L_1 + L_2 + L_3 + \ldots + L_n)/n$$

scaling vectors of a deformation monitoring point of the GNSS monitoring network of the alpine canyon complex environment according to coordinate differences $\Delta X_{Ai}, \Delta Y_{Ai}, \Delta Z_{Ai}$ measured by the deformation monitoring point relative to a starting point A and the obtained $\overline{L_n}$ through the following formula:

$$X_i = X_A + \overline{L_n} \cdot \Delta X_{Ai}$$

$$Y_i = Y_A + \overline{L_n} \cdot \Delta Y_{Ai}$$

$$Z_i = Z_A + \overline{L_n} \cdot \Delta Z_{Ai}$$

wherein $(X_i, Y_i, Z_i)$ represents coordinates of the deformation monitoring point and $(X_A, Y_A, Z_A)$ represents coordinates of the starting point A, thereby determining the monitoring results with additional length correction; and
   importing the coordinates of the deformation monitoring point into adjustment software to perform the data reduction; and
   positioning the alpine canyon complex environment according to a corrected GNSS monitoring network after the data reduction, thereby monitoring and preventing natural disasters of the alpine canyon complex environment.

2. The GNSS emergency monitoring error suppression method according to claim 1, wherein the calculating a valuation $\widehat{\Delta L}$ of the length ratio difference $\Delta L_i$ through a robust estimation method comprises the following steps:
   obtaining the valuation $\widehat{\Delta L}$ of the length ratio difference $\Delta L_i$ through the following formula:

$$\widehat{\Delta L} = \hat{\Delta} + \hat{\varepsilon} Y_M;$$

wherein $Y_M$ represents an abscissa value of a central point in the GNSS monitoring network of the alpine canyon complex environment; and $\hat{\Delta}$ and $\hat{\varepsilon}$ are obtained through the following formula:

$$\begin{cases} \hat{\Delta} = \dfrac{\sum Y_i^2 \sum \Delta L_i - \sum Y_i \sum \Delta L_i Y_i}{n \sum Y_i^2 - \left(\sum Y_i\right)^2} \\ \hat{\varepsilon} = \dfrac{n \sum \Delta L_i Y_i - \sum \Delta L_i \sum Y_i}{n \sum Y_i^2 - \left(\sum Y_i\right)^2} \end{cases};$$

and
   wherein $Y_i$ represents a spatial distribution of an i-th edge.

3. The GNSS emergency monitoring error suppression method according to claim 1, wherein before the calculating a valuation $\widehat{\Delta L}$ of the length ratio difference $\Delta L_i$ through a robust estimation method, the method further comprises:
   determining whether the length ratio difference $\Delta L_i$ is abnormal based on the following formula, and eliminating the abnormal length ratio difference $\Delta L_i$:

$$\rho = \frac{\frac{1}{n}\sum_{i=1}^{n}(Y_i - \overline{Y})(\Delta L_i - \overline{\Delta L})}{\sqrt{\frac{1}{n}\sum_{1}^{n}(\Delta L_i - \overline{\Delta L})^2 \frac{1}{n}\sum_{i=1}^{n}(Y_i - \overline{Y})^2}}.$$

4. A GNSS emergency monitoring error suppression method for an alpine canyon complex environment, comprising the following steps:
   constructing a GNSS monitoring network corresponding to the alpine canyon complex environment;

obtaining a length ratio $L_{ir}$ containing an error of an edge in the GNSS monitoring network corresponding to the alpine canyon complex environment and a theoretical length ratio $L_{it}$ of the edge in the GNSS monitoring network corresponding to the alpine canyon complex environment;

calculating a length ratio difference $\Delta L_i$ between the length ratio $L_{ir}$ and the theoretical length ratio $L_{it}$, and calculating a valuation $\widehat{\Delta L}$ of the length ratio difference $\Delta L_i$;

performing automatic monitoring to obtain a plurality of datum points of the GNSS monitoring network and determining n numbers of initial edge lengths corresponding to the plurality of datum points;

calculating n numbers of L values: $L_1, L_2, L_3, \ldots, L_n$ according to the following formula:

$$L = \frac{D_{ab}}{DG_{ab}};$$

wherein L represents a length ratio between a measured edge length and a GNSS result-based inversely calculated edge length, $D_{ab}$ represents the measured edge length, and $DG_{ab}$ represents the GNSS result-based inversely calculated edge length;

averaging the n numbers of L values to obtain a mean value according to the following formula:

$$\overline{L}_n = (L_1 + L_2 + L_3 + \ldots + L_n)/n;$$

scaling vectors of a deformation monitoring point of the GNSS monitoring network according to coordinate differences $\Delta X_{Ai}, \Delta Y_{Ai}, \Delta Z_{Ai}$ measured by the deformation monitoring point relative to a starting point A and the obtained $\overline{L}_n$ through the following formula:

$$X_i = X_A + \overline{L}_n \cdot \Delta X_{Ai}$$

$$Y_i = Y_A + \overline{L}_n \cdot \Delta Y_{Ai}$$

$$Z_i = Z_A + \overline{L}_n \cdot \Delta Z_{Ai}$$

wherein $(X_i, Y_i, Z_i)$ represents coordinates of the deformation monitoring point and $(X_A, Y_A, Z_A)$ represents coordinates of the starting point A; and performing data reduction on the coordinates of the deformation monitoring point, and then positioning the alpine canyon complex environment, thereby monitoring and preventing natural disasters of the alpine canyon complex environment.

5. The GNSS emergency monitoring error suppression method according to claim 4, wherein the calculating a valuation $\widehat{\Delta L}$ of the length ratio difference $\Delta L_i$ comprises the following steps:

obtaining the valuation $\widehat{\Delta L}$ of the length ratio difference $\Delta L_i$ through the following formula:

$$\widehat{\Delta L} = \hat{\Delta} + \hat{\varepsilon} Y_M;$$

wherein $Y_M$ represents an abscissa value of a central point in the GNSS monitoring network corresponding to the alpine canyon complex environment; and $\hat{\Delta}$ and $\hat{\varepsilon}$ are obtained through the following formula:

$$\begin{cases} \hat{\Delta} = \dfrac{\sum Y_i^2 \sum \Delta L_i - \sum Y_i \sum \Delta L_i Y_i}{n \sum Y_i^2 - \left(\sum Y_i\right)^2} \\ \hat{\varepsilon} = \dfrac{n \sum \Delta L_i Y_i - \sum \Delta L_i \sum Y_i}{n \sum Y_i^2 - \left(\sum Y_i\right)^2} \end{cases};$$

and wherein $Y_i$ represents a spatial distribution of an i-th edge.

* * * * *